Nov. 21, 1950          H. N. BANEY          2,530,502

MILLING MACHINE HEAD

Filed Sept. 18, 1947          2 Sheets-Sheet 1

Inventor
Harry N. Baney

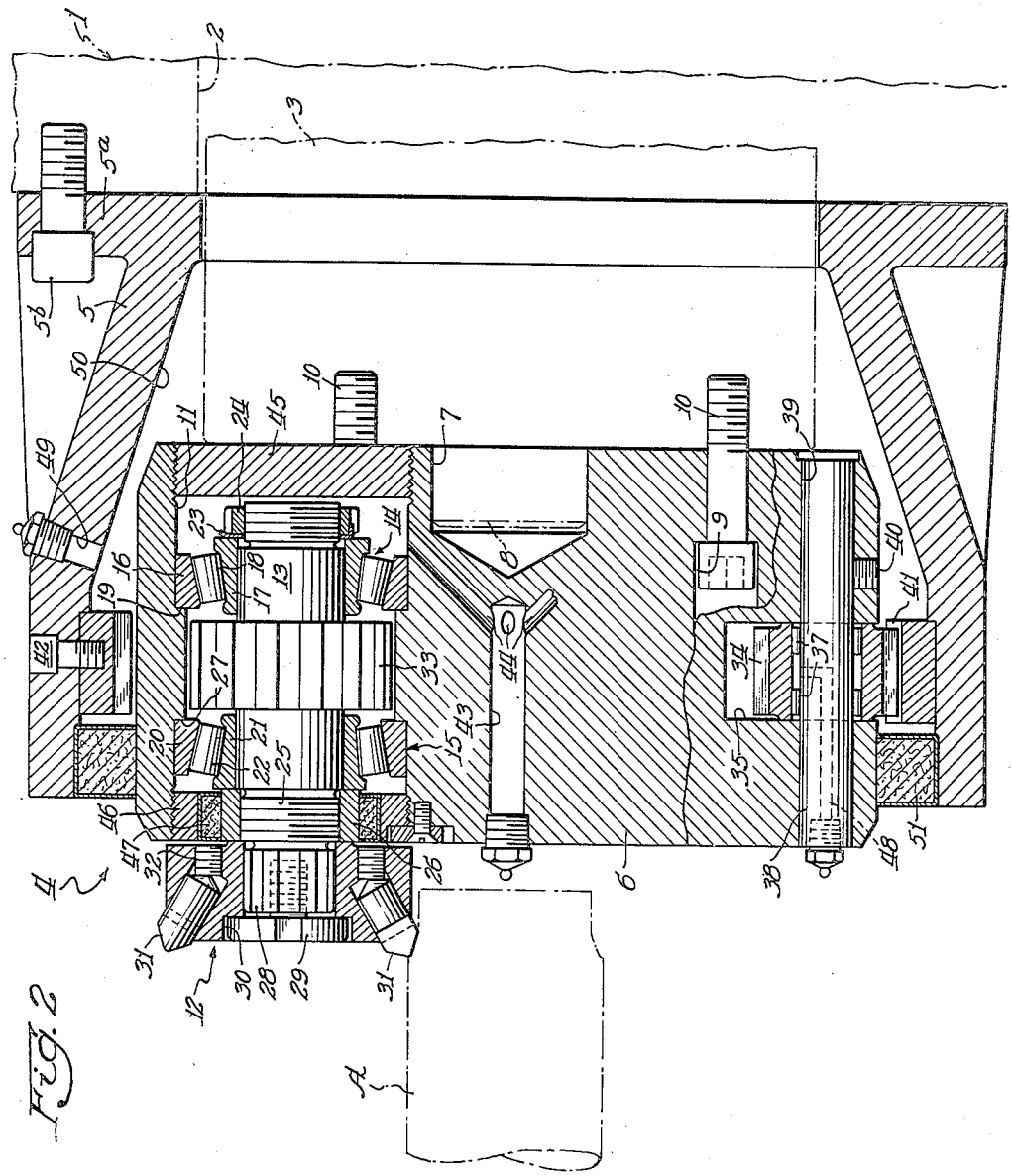

Patented Nov. 21, 1950

2,530,502

UNITED STATES PATENT OFFICE 2,530,502

MILLING MACHINE HEAD

Harry N. Baney, Muncie, Ind., assignor to Borg-Warner Corporation, Chicago, Ill., a corporation of Illinois Application September 18, 1947, Serial No. 774,838

3 Claims. (Cl. 90—11)

This invention relates to a milling device and more particularly to an improved milling head for grinding and cutting machines and the like.

In the manufacture of shafts and the life, a single cutter, for example a hob, is conventionally employed and is carried by a rotating spindle of a milling machine for reducing shaft diameters, for machining the ends of shafts or for otherwise shaping the shaft to a desired form. The cutter is usually formed of high grade steel, or other extremely hard cutting material, and is revolved at high speed by a rotatable spindle for cutting the shaft. The cutter must be held in constant engagement with the shaft for a considerable length of time to satisfactorily perform the work operation on the shaft as the steel of which the shaft is formed resists the action of the high grade steel cutters to readily shape the shaft. A constant engagement of the cutter for the length of time usually needed to cut the shaft to satisfactory form, results in considerable wear of the cutter and also raises the temperature of the cutter sufficiently high to increase the possibility of breakage of the cutter, which frequently occurs. As a result, frequent interruptions and delay in manufacturing operations in the mass production of the shafts are normally had for the purpose of replacing worn or broken cutters with attendant loss of production.

It is an object of the present invention to provide an improved milling device having a plurality of cutters adapted to simultaneously engage a workpiece, to shape the workpiece to a desired form so that the cutting operation is of short duration and consequently heating and wear of the cutters in shaping each workpiece to a desired form is negligible, whereby the useful life of each cutter is substantially increased.

Another object of the invention is to provide a novel milling head having cutters and an improved mechanism cooperating with a rotatable spindle to provide a multiple cutting action of the cutters.

Another object of the invention is to provide an improved cutter head comprising a gear mechanism, which may be of the planetary type, adapted to provide a compound motion of the cutters about their own centers of rotation and also about the center of rotation of the milling machine spindle mounting the head whereby the cutters are simultaneously engaged with the workpiece to expedite the cutting operation on the workpiece.

Other objects and advantages of my invention will appear from a consideration of the following description taken in connection with the accompanying drawings in which:

Fig. 2 is a vertical sectional view of the cutter head taken on the line 2—2 of Fig. 1.

Figure 1:
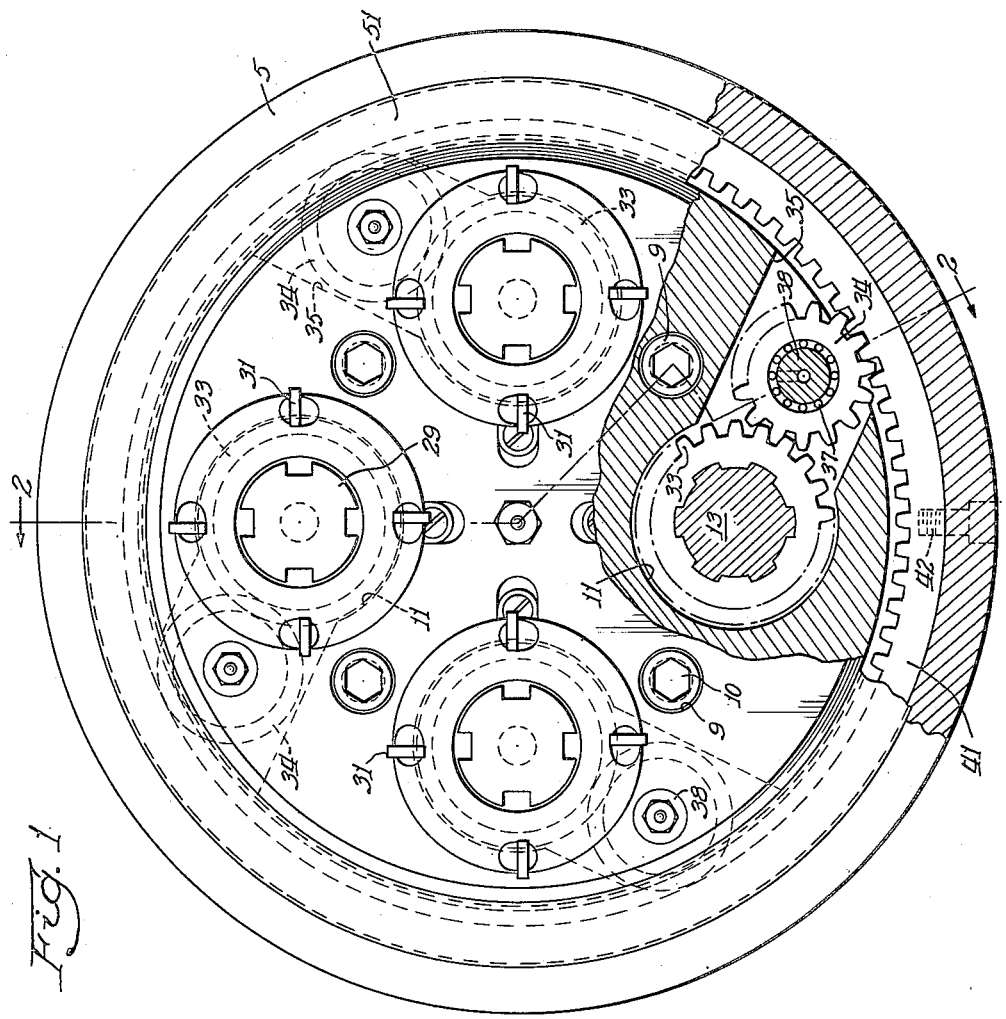
Fig. 1 is a side elevational view, partially in section, of a cutter head embodying my invention.

The drawings are to be understood as being more or less of a schematic character for the purpose of disclosing a typical or preferred embodiment of the improvements contemplated herein, and in these drawings, like reference characters identify the same parts wherever these parts appear in the different views.

Referring now to the figures of the drawings, the numeral 1 generally designates a stationary part of a milling machine having an opening 2 therein adapted to receive a rotatable spindle 3 in conventional manner. My improved cutter head generally designated 4 comprises a bell-shaped casting 5 having a radially extending annular flange 5a secured by means of bolts 5b to the stationary part 1 of the milling machine. Within the casting 5 is an adapter 6 in the form of a cylindrical shell or casing having an axially extending opening 7 in one side thereof for receiving the reduced end portion 8 of the spindle 3 whereby the shell 6 is centered by the end 8 of the spindle 3 with the axes of the shell 6, spindle 3, and casting 5 in alignment. Equidistantly spaced about the axis of the shell 6 and radially outward thereof are four openings 9 extending therethrough receiving bolts 10 adapted to be threaded into openings in the end of the spindle 3 for securing the shell 6 in fixed relation to the spindle 3 and for rotation with the spindle 3. The shell 6 is also provided with four bores 11 extending axially of the shell 6 and spaced radially outward therefrom equidistant from each other as clearly shown in Fig. 1. Mounting the cutters, generally designated 12, are stubshafts 13 forming a portion of the gear mechanism now to be described.

In each of the bores 11 is a spindle or stubshaft 13 carried by spaced roller bearing assemblies 14 and 15, the bearing assembly 14 comprising the outer and inner raceway members 16 and 17 receiving therebetween and cooperating with a series of roller bearings 18, and the roller bearing assembly 15 having outer and inner raceways 20 and 21 cooperating with roller bearings 22. It may be noted from an inspection of Fig. 2 that the raceways of the roller bearing assemblies 14 and 15 are conical in form. To prevent axial movement of each stubshaft 13, one end of the shaft is threaded to receive a washer 23 and locknut 24 to urge the raceway 16, by means of the raceway 17 and roller 18, into engagement with a shoulder 19 formed on the shell 6. Adjacent the other end of the shaft 13 is a threaded portion 25 having engagement with a nut 26 engageable with a collar 21 of the roller bearing assembly 15 to urge the raceway 20 into engagement with a shoulder 27 on the shell 6 by means of the roller bearings 22, as shown. It will therefore be apparent that each stubshaft 13 is maintained against axial movement upon pressure being exerted on the cutters 12 during the cutting operation. Each stubshaft 13 has a splined end 28 in engagement with splines of the cutter 12 to impart rotary movement to the cutter 12. Each cutter 12 is detachably secured to its associated shaft 13 and maintained against axial movement by means of a bolt 29 threaded into the splined end of the shaft 13 and the head of the bolt is received within an annular recess 30 in the cutter 12 to urge the cutter 12 into engagement with the nut 26 on the shaft 13. Each cutter 12 is provided with a plurality of removable cutting teeth 31, either of high speed steel or carbide, and for the purpose of mounting the teeth, each cutter 12 being provided with radially spaced and circumferentially disposed openings for reception of the teeth 31 and communicating with axially extending openings receiving screws 32 threaded in the cutter 12 for adjustably mounting the teeth 31 for movement into or out of the cutters 12, as desired. It will also be apparent that the teeth 31 may be readily attached or detached from the associated cutter 12.

Driving means are provided for rotating the cutters 12 in unison, comprising a gearing arrangement, preferably of the planetary type, and including a plurality of planet gears 33, a planet gear being splined to each stubshaft 13 intermediate the roller bearing assemblies 14 and 15 mounting the shaft. The planet gear 33 is in mesh with a planet gear 34 received within a radial passage 35 in the shell 6 and rotatably mounted by means of roller bearings 37 on a shaft 38 disposed in an axially extending bore 39 intersecting the passage 35, the shaft 38 being fixed in the bore 39 by means of a conical point set screw 49. Each of the gears 34 has its teeth meshing with the teeth of a ring gear 41 fixed to the stationary bell casting 5 by bolts 42 received within openings in the casting 5 and having threaded engagement with the ring gear 41. It may be noted that a planetary cage is thus provided by the shell 6 for carrying the planetary gears or pinions 33 rotatable with the stubshafts 13 and also for the gears 34 rotatably mounted on the shafts 38 fixed to the shell 6.

To provide for adequate lubrication of the gearing arrangement, the planetary cage 6 has an axial opening 43 communicating with passages 44 leading to the bores 11. To prevent escape of lubricant, a closure plate 45 is threaded into one end of each bore 11 and at the other end of the bore another closure ring 46 is provided, a packing ring 47 being disposed between the closure ring 46 and the nut 26. The roller bearings 37 mounting the gears 34 on the shaft 38 are lubricated by means of axially extending oil passages 48 in the shafts 38 leading to the roller bearings 37. An opening 49 is provided in the casting 5 for supplying lubricant to the chamber 50 and an annular packing ring 51 is received between the casting 5 and shell 6 to prevent the escape of lubricant from the chamber 50. It may be noted from a consideration of the drawings that lubricant inlet passages 43, 48 and 49 are provided with caps, as shown, to prevent escape of the lubricant from the cutter head 4 and to permit the addition of lubricant to the cutter head as required.

In the operation of my improved cutter head, I have shown in Fig. 2 the cutters in an operative position to cut down the diameter of a shaft A at one end thereof. Considering now the operation of the cutter head, it will be noted that, upon rotation of the milling machine spindle 3, the planet carrier cage 6 will be rotated. As the ring gear 41 is held against rotation through its connection with the stationary part 1 of the milling machine, the gears 34 in mesh with the ring gear 41 will be rotated, and the gears 34 in turn will cause the gears 33 to rotate and thereby the cutters 12.

It will be apparent that the stationary ring gear 41 provides a reaction to the rotation of the planet gears 33 and 34 so that the latter gears will be rotated at a substantially higher speed than the spindle 3 and in the direction of of rotation of the spindle 3.

It will also be apparent that rotation of the spindle 3 and the planetary cage attached thereto results in a compound motion of the milling cutters 12, the cutters having rotation about their own axes of rotation and a planetary motion about the axis of rotation of the machine spindle as well. In other words, a multiple cutting action of the cutters is obtained by the differential movement of the constantly revolving adapter or shell 6, which transmits movement to the cutters through the stationary ring gear 41 whereby the cutters thus not only revolve in the cutting path of the diameter of the shaft, but they will also revolve upon their own centers of rotation, presenting many cutting teeth per minute to the work, and since only one cutting tooth of each cutter is in cutter engagement at any time, and is then moved out of the cut (due to the constant spindle movement) a multiple cutting action is obtained.

It can therefore be seen that the cutting teeth 31 disposed equidistantly circumferentially of each tool holder 12 will be brought successively into engagement with the shaft A during the cutting of the shaft to a suitable diameter. However, due to the compound motion of the cutters, many more cutting teeth per minute will be presented to the shaft than a single cutter conventionally used to cut shafts, so that the diameter of the shaft is quickly reduced to the required extent and, accordingly, the cutters remain in contact with the shaft for only a short period of time. As the cutting operation is quickly performed and there is less cut per tooth, heating of the cutters is negligible and breakage of the cutters is avoided. Also, due to the rapidity of the cutting operation, wear of the cutting teeth is slight and the useful lives of the same are considerably increased. As a result, manufacturing operations need not be frequently interrupted for the purpose of replacement of worn or broken cutters and production of the shafts is accelerated. In conclusion, I have noted that my novel cutter head is effective to rough cut and provide fine surface finish in a single operation or to provide large rough cuts with little expenditure of the power necessary to rotate the milling machine spindle.

It will be understood that other cutters than those described and illustrated may be utilized

I claim:

1. A milling head comprising a plurality of cutters, planetary gear mechanism including planet gears connected to said cutters for rotating the cutters, a stationary ring gear formed with internal teeth, planet gears meshing with said first-mentioned planet gears and with the internal teeth of said ring gear, and a carrier for said planet gears, and means for rotating said carrier.

2. In combination with a milling machine having a rotatable member and a stationary cylindrical member receiving said rotatable member, a milling head comprising a casing connected to said stationary member, planetary gear mechanism in said casing and comprising a ring gear formed with internal teeth and fixed to said casing, planet pinions meshing with the internal teeth of said ring gear, planet gears meshing with said planet pinions, a rotatable carrier for said planet gears and pinions, a plurality of cutters drivingly connected to said planet gears, and means for connecting said carrier and said rotatable member.

3. A milling device comprising a stationary hollow casing, a rotatable member extending within said casing, a plurality of cutters arranged concentrically about the axis of rotation of said member, planetary gear mechanism within said casing and comprising a ring gear fixed to said casing, a set of planet pinions meshing with said ring gear, a second set of planet pinions meshing with said first-mentioned set, a carrier for said sets of planet pinions, there being a plurality of sets of axially extending openings formed in said carrier, shafts rotatably mounted in one set of openings and upon which said cutters and the planet pinions of said second set are mounted anti-friction bearings disposed between said shafts and the casing on opposite sides of the planet pinions, and shafts mounted in the other set of openings upon which said first set of planet pinions is mounted.

HARRY N. BANEY.

REFERENCES CITED

The following references are of record in the file of this patent:

UNITED STATES PATENTS

| Number | Name | Date |
|---|---|---|
| 582,081 | Newton | May 4, 1897 |
| 1,087,364 | Goetz et al. | Feb. 17, 1914 |
| 2,199,379 | Tornebohn | May 7, 1940 |